United States Patent
Mizuno et al.

(10) Patent No.: US 9,614,212 B2
(45) Date of Patent: *Apr. 4, 2017

(54) METHOD OF PRODUCING COMPOSITE POROUS MEMBRANE

(71) Applicant: Toray Battery Separator Film Co., Ltd., Nasushiobara (JP)

(72) Inventors: Naoki Mizuno, Ohtsu (JP); Michihiko Irie, Ohtsu (JP); Yoshitaka Ayuzawa, Ohtsu (JP); Masanori Nakamura, Ohtsu (JP)

(73) Assignee: Toray Battery Separator Film Co., Ltd. (JP)

( * ) Notice: Subject to any disclaimer, the term of this patent is extended or adjusted under 35 U.S.C. 154(b) by 319 days.

This patent is subject to a terminal disclaimer.

(21) Appl. No.: 14/596,490

(22) Filed: Jan. 14, 2015

(65) Prior Publication Data

US 2015/0122400 A1    May 7, 2015

Related U.S. Application Data

(62) Division of application No. 13/805,056, filed as application No. PCT/JP2010/064507 on Aug. 26, 2010, now abandoned.

(30) Foreign Application Priority Data

Jun. 25, 2010 (JP) ................ 2010-145109

(51) Int. Cl.
| | | |
|---|---|---|
| B32B 3/26 | (2006.01) |
| B32B 27/28 | (2006.01) |
| B32B 27/32 | (2006.01) |
| B32B 27/34 | (2006.01) |
| C08J 9/28 | (2006.01) |
| H01M 2/16 | (2006.01) |
| H01M 2/14 | (2006.01) |
| B29C 67/20 | (2006.01) |
| B32B 37/00 | (2006.01) |
| B32B 27/08 | (2006.01) |
| B32B 27/16 | (2006.01) |
| B32B 37/26 | (2006.01) |

(52) U.S. Cl.
CPC ........... *H01M 2/145* (2013.01); *B29C 67/202* (2013.01); *B32B 3/26* (2013.01); *B32B 27/08* (2013.01); *B32B 27/16* (2013.01); *B32B 27/281* (2013.01); *B32B 27/32* (2013.01); *B32B 27/34* (2013.01); *B32B 37/025* (2013.01); *C08J 9/28* (2013.01); *H01M 2/1653* (2013.01); *H01M 2/1686* (2013.01); *B32B 2037/268* (2013.01); *B32B 2250/02* (2013.01); *B32B 2250/24* (2013.01); *B32B 2305/026* (2013.01); *B32B 2307/308* (2013.01); *B32B 2307/724* (2013.01); *B32B 2457/10* (2013.01)

(58) Field of Classification Search
CPC ......... B29C 67/202; B32B 3/26; B32B 27/16; B32B 27/281; B32B 27/32; B32B 27/34; B32B 37/025; B32B 2037/268; B32B 2250/02; B32B 2250/24; B32B 2305/026; B32B 2307/306; B32B 2307/308; B32B 2307/724; B32B 2307/726; B32B 2457/10; C08J 9/28; H01G 9/02; H01G 11/52; H01M 2/145; H01M 2/16; H01M 2/1653; H01M 2/1686; Y10E 60/12; Y10E 60/122; Y10E 60/124
See application file for complete search history.

(56) References Cited

U.S. PATENT DOCUMENTS

2009/0286147 A1    11/2009    Nakajima et al.
2011/0195295 A1    8/2011    Manago et al.

FOREIGN PATENT DOCUMENTS

| JP | 2001-023602 A | 1/2001 |
| JP | 2001-266942 A | 9/2001 |
| JP | 2003-171495 A | 6/2003 |
| JP | 2004-139867 A | 5/2004 |
| JP | 2005-281668 A | 10/2005 |
| JP | 2006-155914 A | 6/2006 |
| JP | 2006-289657 A | 10/2006 |
| JP | 2007-125821 A | * 5/2007 |
| JP | 2009-070609 A | 4/2009 |
| JP | 2009-283273 A | 12/2009 |
| WO | 2008/062727 A1 | 5/2008 |
| WO | 2009/125985 | 10/2009 |
| WO | 2010/013800 | 2/2010 |

* cited by examiner

*Primary Examiner* — Michael Tolin
(74) *Attorney, Agent, or Firm* — DLA Piper LLP (US)

(57) ABSTRACT

A method produces a composite porous membrane including a porous membrane A formed of a polyolefin-based resin; and a porous membrane B containing a heat-resistant resin and laminated on the porous membrane A, including: (i) applying a heat-resistant resin solution onto a base film, followed by passing the coated film through a low-humidity zone, and then through a high-humidity zone to form a heat-resistant resin membrane on the base film; and (ii) bonding together the heat-resistant resin membrane formed in step (i) and a porous membrane A formed of a polyolefin-based resin, followed by converting the heat-resistant resin membrane into a porous membrane B by immersion in a solidification bath, and washing and drying the same to obtain the composite porous membrane.

5 Claims, No Drawings

METHOD OF PRODUCING COMPOSITE POROUS MEMBRANE

RELATED APPLICATIONS

This is a divisional of U.S. patent application Ser. No. 13/805,056, filed Dec. 18, 2012, which is a §371 of International Application No. PCT/JP2010/064507, with an international filing date of Aug. 26, 2010 (WO 2011/161837 A1, published Dec. 29, 2011), which claims priority to Japanese Patent Application No. 2010-145109 filed Jun. 25, 2010, the subject matter of which is incorporated herein by reference.

TECHNICAL FIELD

This disclosure relates to a composite porous membrane including a porous membrane formed of a polyolefin-based resin and a porous membrane containing a heat-resistant resin, the latter porous membrane being laminated on the former porous membrane, and particularly relates to a composite porous membrane which has an excellent ion permeability, an excellent adhesiveness between a polyolefin-based porous membrane and a heat-resistant resin membrane and is useful as a lithium ion battery separator.

BACKGROUND

Porous membranes made of thermoplastic resin are widely used as materials for separation, selective permeation and isolation of substances, and the like. The porous membrane is used in battery separators used for lithium secondary batteries, nickel-hydrogen batteries, nickel-cadmium batteries and polymer batteries, separators for electric double layer capacitors, various kinds of filters such as reverse osmosis membrane filters, ultrafiltration membranes and microfiltration membranes, moisture-permeable waterproof garments, medical materials and the like. Particularly porous membranes made of polyethylene are suitably used as lithium ion secondary battery separators because the porous membrane made of polyethylene has not only such features that it is excellent in electric insulation, has an ion permeability owing to impregnation of an electrolytic solution and is excellent in resistance to electrolytic solution/oxidation resistance, but also a shutdown effect of suppressing an excessive rise in temperature by interrupting a current at a temperature of about 120 to 150° C. at the time of an unusual rise in temperature of a battery. If a rise in temperature after shutdown continues for some reasons, however, breakage of a membrane may occur at a certain temperature due to a reduction in viscosity of molten polyethylene constituting the membrane and shrinkage of the membrane. If the membrane is left standing under a certain high temperature, breakage of a membrane may occur after elapse of a certain time period due to a reduction in viscosity of molten polyethylene and shrinkage of the membrane. This phenomenon is not limited to polyethylene, and cannot be avoided at a temperature equal to or higher than the melting point of a resin constituting the porous membrane even if any other thermoplastic resin is used.

Particularly, a lithium ion battery separator has a significant influence on battery characteristics, battery productivity and battery safety, and is required to have excellent mechanical characteristics, heat resistance, permeability, dimensional stability, pore blocking characteristics (shutdown characteristics), melt membrane breakage preventing characteristics (meltdown preventing characteristics) and the like. Thus, various studies on improvement of heat resistance have been conducted. Further, to improve battery capacity, it is predicted that the thicknesses of not only electrodes but also separators will be still further reduced to increase the area of those components that can be filled in a container. Deformation in the plane direction more easily occurs as the thicknesses of porous films are increasingly reduced, and therefore a heat-resistant resin layer may be peeled off during processing of a composite porous membrane or a slitting step or a battery assembly step so that it becomes difficult to ensure safety.

To keep up with cost reduction, it is expected that the speed will be increasingly enhanced in the battery assembly step, and we believe that it is also required to diminish troubles such as peeling of the heat-resistant resin layer in such high-speed processing, and for meeting the requirement, a still higher adhesiveness is necessary. Japanese Patent Laid-open Publication No. 2005-281668 discloses a lithium ion secondary battery separator obtained by applying a polyamideimide resin directly to a polyolefin porous membrane having a thickness of 25 μm so that the film thickness of the polyamideimide resin is 1 μm, and immersing the coated membrane in water at 25° C., followed by drying the same.

In a roll coating method, a die coating method, a bar coating method, a blade coating method or the like that is generally used for applying a coating solution to a polyolefin porous membrane as in Japanese Patent Laid-open Publication No. 2005-281668, penetration of a resin component into the polyolefin-based porous membrane cannot be avoided due to the shear force thereof, and a considerable rise in gas permeation resistance and a reduction in shutdown function cannot be avoided. In that method, particularly when the film thickness of the polyolefin-based porous membrane is as small as less than 10 μm, the resin component easily fills in pores, leading to an extreme rise in gas permeation resistance. Further, this method has such a problem that unevenness of the film thickness of the polyolefin-based porous membrane easily causes unevenness of the film thickness of the heat-resistant resin layer, leading to variations in gas permeability resistance.

Japanese Patent Laid-open Publication No. 2001-266942 shows, as an example, an electrolytic solution carrying polymer membrane obtained by immersing a nonwoven fabric formed of aramid fibers having an average thickness of 36 μm in a dope containing a vinylidene fluoride-based copolymer as a heat-resistant resin, and drying the same.

Japanese Patent Laid-open Publication No. 2003-171495 shows, as an example, a composite porous membrane obtained through steps of immersing a polypropylene porous membrane having a film thickness of 25.6 μm in a dope having, as a main component, polyvinylidene fluoride as a heat-resistant resin, followed by solidifying the resultant, washing the same with water, and drying the same.

When a unwoven fabric formed of aramid fibers is immersed in a heat-resistant resin solution as in Japanese Patent Laid-open Publication No. 2001-266942, heat-resistant porous layers are formed within and on both surfaces of the unwoven fabric, and therefore continuous pores within the unwoven fabric are mostly blocked so that not only a considerable rise in gas permeation resistance cannot be avoided but also a shutdown function that affects safety of a separator can not be obtained. Further, the unwoven fabric is not suitable for an increase of the capacity of a battery which will be advanced in future because it is difficult to reduce the thickness thereof as compared to the polyolefin-based porous membrane.

In Japanese Patent Laid-open Publication No. 2003-171495, heat-resistant porous layers are also formed within and on both surfaces of the polypropylene porous membrane so that as in the case of Japanese Patent Laid-open Publication No. 2001-266942, a considerable rise in gas permeation resistance cannot be avoided, and it is difficult to obtain a shutdown function.

Japanese Patent Laid-open Publication No. 2001-23602 discloses a separator having a heat-resistant porous layer formed of para-aramid, which is obtained by, when applying a solution of a para-aramid resin as a heat-resistant resin directly to a porous film made of polyethylene having a thickness of 25 μm, preliminarily impregnating the porous film made of polyethylene with a polar organic solvent that is used in the heat-resistant resin solution for avoiding a considerable rise in gas permeation resistance, and forming the porous film into a clouded membrane in a Temperature & Humidity Chamber set at a temperature of 30° C. and a relative humidity of 65% after applying the heat-resistant resin solution to the porous film, followed by washing and drying the same.

In Japanese Patent Laid-open Publication No. 2001-23602, there is no considerable rise in gas permeation resistance. However, the adhesiveness between the porous film made of polyethylene and the heat-resistant resin is extremely low, and particularly when the thickness of the porous film made of polyethylene is less than 10 μm, deformation easily occurs in the plane direction, and therefore the heat-resistant resin layer may be peeled off in the battery assembly step so that it becomes difficult to ensure safety.

Japanese Patent Laid-open Publication No. 2007-125821 discloses a composite porous membrane obtained by applying a polyamideimide resin solution to a propylene film, passing the coated film an atmosphere at 25° C. and 80% RH for 30 seconds to obtain a semi-gel porous membrane, then laminating on the semi-gel porous membrane a polyethylene porous film having a thickness of 20 μm or 10 μm, and immersing the laminate in an aqueous solution containing N-methyl-2-pyrrolidone (NMP), followed by washing the same with water and drying the same.

In Japanese Patent Laid-open Publication No. 2007-125821, there is no considerable rise in gas permeation resistance. However, the adhesiveness between the porous film made of polyethylene and the heat-resistant resin is extremely low, and particularly when the thickness of the porous film made of polyethylene is less than 10 μm, the heat-resistant resin layer may be peeled off as in Japanese Patent Laid-open Publication No. 2001-23602 so that it becomes difficult to ensure safety.

Thus, in a composite porous membrane including a porous membrane such as a polyolefin-based porous membrane as a base material and a heat-resistant resin layer, the heat-resistant resin layer being laminated on the porous membrane, a rise in gas permeation resistance increases when improving an adhesiveness of the heat-resistant resin layer by penetrating a heat-resistant resin into the porous membrane as a base material, while when penetration of the heat-resistant resin is reduced, a rise in gas permeation resistance can be kept low; however, the adhesiveness of the heat-resistant resin layer decreases so that it becomes difficult to ensure safety for which requirements become more and more severe when considering speed enhancement in the battery assembly step while the thickness of a separator is increasingly reduced. Thus, there has not been a composite porous membrane which can achieve both a high adhesiveness of a heat-resistant resin layer and a small rise in gas permeation resistance so far. Further, it becomes more and more difficult to achieve both a high adhesiveness of a heat-resistant resin layer and a small rise in gas permeation resistance as the film thickness of the porous membrane such as a polyolefin-based porous membrane as a base material is reduced.

It could therefore be helpful to provide a composite porous membrane which can achieve both an excellent adhesiveness of a heat-resistant resin layer and a small rise in gas permeation resistance even in the case of further reducing the thickness of composite porous membranes, for example, battery separators, and is intended to provide a composite porous membrane suitable especially for a battery separator, which is suitable for an increase of the capacity of a battery, and to achieve an excellent ion permeability and high-speed processability in a battery assembly processing step.

SUMMARY

We thus provide:

(1) A composite porous membrane comprising a porous membrane A formed of a polyolefin-based resin and a porous membrane B containing a heat-resistant resin, the porous membrane B being laminated on the porous membrane A, wherein the porous membrane A satisfies the following formulas (A) to (C), and the composite porous membrane satisfies formula (D), wherein the composite porous membrane further satisfies the following formulas (E) and (F):

thickness of porous membrane A<10 μm     formula (A)

$0.01$ μm≤average pore diameter of porous membrane A≤1.0 μm     formula (B)

30% porosity of porous membrane A≤70%     formula (C)

thickness of entire composite porous membrane ≤13 μm     formula (D)

peel strength at interface between porous membrane A and porous membrane B≥1.0 N/25 mm     formula (E)

20≤Y−X≤100     formula (F)

wherein X is a gas permeation resistance (seconds/100 ccAir) of porous membrane A, and Y is a gas permeation resistance (seconds/100 ccAir) of entire composite porous membrane.

(2) The composite porous membrane according to (1), wherein the gas permeation resistance of the composite porous membrane is 50 to 600 seconds/100 ccAir.

(3) The composite porous membrane according to (1) or (2), wherein the heat-resistant resin is a polyamideimide resin, a polyimide resin or a polyamide resin.

(4) The composite porous membrane according to (3), wherein the heat-resistant resin is a polyamideimide resin having a logarithmic viscosity of 0.5 dl/g or more.

(5) A method of producing the composite porous membrane according to any one of (1) to (4), the method comprising steps (i) and (ii):

step (i): a step of applying a heat-resistant resin solution onto a base film, followed by passing the coated film through a low-humidity zone having an absolute humidity of less than 6 g/m³, and then through a high-humidity zone having an absolute humidity of 6 g/m³ or more and 25 g/m³ or less to form a heat-resistant resin membrane on the base film; and step (ii): a step of bonding together the heat-resistant resin membrane formed in the step (i) and a porous membrane A formed of a polyolefin-based resin, followed by converting the heat-resistant resin membrane into a porous membrane B by immersion in a solidification bath, and washing and drying the same to obtain a composite porous membrane.

(6) The method of producing the composite porous membrane according to (5), wherein the base film is peeled off after the composite porous membrane is obtained in the step (ii).

(7) The method of producing the composite porous membrane according to (5) or (6), wherein the base film is a polyester-based film or polyolefin-based film having a thickness of 25 to 100 μm.

(8) The method of producing the composite porous membrane according to any one of (5) to (7), wherein in the step (i), the time of passage through the low-humidity zone is 3 seconds or more and 20 seconds or less, and the time of passage through the high-humidity zone is 3 seconds or more and 10 seconds or less.

(9) A battery separator comprising the composite porous membrane according to any one of (1) to (4).

The composite porous membrane achieves both an excellent adhesiveness of a heat-resistant resin layer and a small rise in gas permeation resistance, is therefore suitable for an increase of the capacity of a battery and to achieve an excellent ion permeability and high-speed processability in a battery assembly processing step, and can be suitably used especially for a battery separator.

DETAILED DESCRIPTION

A composite porous membrane includes a porous membrane A formed of a polyolefin-based resin and a porous membrane B containing a heat-resistant resin, the porous membrane B being laminated on the porous membrane A, and achieves an excellent adhesiveness of a heat-resistant resin layer by advanced processing technology without causing a considerable rise in gas permeation resistance by lamination.

"Considerable rise in gas permeation resistance" means that the difference between a gas permeation resistance (X) of the porous membrane as a base material and a gas permeation resistance (Y) of the composite porous membrane is more than 100 seconds/100 ccAir. "Excellent adhesiveness of the heat-resistant resin layer" means that the peel strength is 1.0 N/25mm or more, and it is preferably 1.5 N/25mm or more, further preferably 2.0 N/25mm or more. If the peel strength is less than 1.0 N/25mm, the heat-resistant resin layer may be peeled off during high-speed processing in a battery assembly step. The upper limit of the peel strength is not particularly specified; however, a strength of 30 N/25mm is sufficient in terms of an adhesiveness.

First, the porous membrane A will be described.

A resin for forming the porous membrane A is preferably polyolefin, especially preferably polyethylene. This is because polyolefin has, in addition to basic characteristics such as electric insulation and an ion permeability, a shutdown effect of suppressing an excessive rise in temperature by interrupting a current at a temperature at the time of an unusual rise in temperature of a battery.

The resin for forming the porous membrane A has a mass average molecular weight of preferably 300,000 or more, further preferably 400,000 or more, most preferably 500,000 or more, from the viewpoints of step operability and mechanical strength that bears various external pressures generated at the time of winding with an electrode, for example, tensile strength, elastic modulus, elasticity and puncture strength. When such a resin is used, a polyolefin component having a mass average molecular weight within the above-mentioned range is contained in an amount of preferably 50% by weight or more, further preferably 60% by weight or more. If the content is less than the above-mentioned range, deterioration of mechanical physical properties when the temperature rises over the shutdown temperature is significant because of low melting viscosity, and melt breakage of a membrane may be caused by a winding pressure and burr in the electrode end part even around the shutdown temperature.

The phase structure of the porous membrane A varies depending on a production method. Any phase structure appropriate to the purpose may be provided according to the production method without restraint as long as the above-mentioned various features are satisfied. Examples of the method of producing a porous membrane include a foaming method, a phase separation method, a melt and recrystallization method, a drawing opening method and a powder sintering method, and among them, a phase separation method is preferable from the viewpoints of homogenization of micropores and costs.

The porous membrane A is required to have such a function that pores are blocked in case of abnormality of a charge/discharge reaction (shutdown function). Thus, the melting point (softening point) of the resin for forming the porous membrane A is preferably 70 to 150° C., further preferably 80 to 140° C., most preferably 100 to 130° C. If the melting point is lower than 70° C., practical performance is poor because a shutdown function may be exhibited at the time of normal use, thus making it impossible to use a battery, and if the melting point is higher than 150° C., a shutdown function may be exhibited after an abnormal reaction sufficiently proceeds so that safety may not be ensured.

The film thickness of the porous membrane A needs to be less than 10 gm. The upper limit thereof is preferably 9.5 gm, more preferably 9 gm. The lower limit thereof is preferably 5 gm, more preferably 6 gm. If the thickness is less than 5 gm, practical membrane strength and a shutdown function may not be retained, and if the thickness is 10 gm or more, the area of a battery case per volume is significantly limited, thus being not suitable for an increase of the capacity of a battery which will be advanced in future.

The upper limit of the gas permeation resistance (JIS-P8117) of the porous membrane A is preferably 500 seconds/100 ccAir, further preferably 400 seconds/100 ccAir, most preferably 300 seconds/100 ccAir, and the lower limit thereof is preferably 50 seconds/100 ccAir, further preferably 70 seconds/100 ccAir, most preferably 100 seconds/100 ccAir.

The upper limit of the porosity of the porous membrane A is 70%, preferably 60%, further preferably 55%. The lower limit thereof is 30%, preferably 35%, further preferably 40%. If either the gas permeation resistance is higher than 500 seconds/100 ccAir or the porosity is lower than 30%, charge/discharge characteristics, particularly ion permeability (charge/discharge operating voltage) and life of a battery (closely related to the amount of an electrolytic solution to be retained) are not sufficient, and if these ranges are exceeded, a function as a battery may not be sufficiently exhibited. On the other hand, if either the gas permeation resistance is lower than 50 seconds/100 ccAir or the porosity is higher than 70%, sufficient mechanical strength and insulation cannot be obtained, thus raising a possibility that a short circuit occurs at the time of charge/discharge.

The average pore diameter of the porous membrane A is 0.01 to 1.0 um, preferably 0.05 to 0.5 um, further preferably 0.1 to 0.3 um because it significantly influences the shutdown speed. If the average pore diameter is less than 0.01 μm, an anchor effect of a heat-resistant resin may be hard to be obtained so that a sufficient adhesiveness of the heat-resistant resin may not be obtained, and also a possibility is raised that the gas permeation resistance is considerably deteriorated at the time of forming into a composite membrane. If the average pore diameter is more than 1.0 μm, such a phenomenon may occur that response of the shutdown phenomenon to the temperature becomes slow, or the shutdown temperature associated with the temperature rising speed is shifted toward a higher temperature side. Further, as to the surface state of the porous membrane A, an adhesiveness with the porous membrane B tends to be stronger when the surface roughness (arithmetic average roughness) is within a range of 0.01 to 0.5 μm. If the surface roughness is lower than 0.01 μm, an effect of improving the adhesiveness cannot be attained, and if the surface roughness is higher than 0.5 um, the mechanical strength of the porous membrane A may be reduced or irregularities may be transferred to the surface of the porous membrane B.

Next, the porous membrane B will be described.

The porous membrane B contains a heat-resistant resin, and plays a role of supporting/reinforcing the porous membrane A due to its heat resistance. Thus, the glass transition temperature of the heat-resistant resin for forming the porous membrane B is preferably 150° C. or higher, further preferably 180° C. or higher, most preferably 210° C. or higher, and the upper limit thereof is not particularly limited. When the glass transition temperature is higher than the decomposition temperature, it suffices that the decomposition temperature falls within the above-mentioned range. When the glass transition temperature is lower than 150° C., a sufficient heat resistant membrane breakage temperature may not be obtained, and high safety may not be ensured.

The heat-resistant resin for forming the porous membrane B is not particularly limited as long as it has a heat resistance. However, examples thereof may include resins having polyamideimide, polyimide or polyamide as a main component, and resins having polyamideimide as a main component are preferable. These resins may be used alone, or may be used in combination with other materials.

A description will be provided below concerning a case of using a polyamideimide resin as a heat-resistant resin.

Generally, synthesis of a polyamideimide resin is carried out by a common method such as an acid chloride method using trimellitic acid chloride and diamine, a diisocyanate method using a trimellitic anhydride and diisocyanate, or the like; however, a diisocyanate method is preferable from the viewpoint of production costs.

As an acid component that is used in synthesis of the polyamideimide resin, mention is made of a trimellitic acid anhydride (chloride), and a part thereof may be replaced by any other polybasic acid or an anhydride thereof. Examples thereof include tetracarboxylic acids such as pyromellitic acid, biphenyltetracarboxylic acid, biphenylsulfonetetracarboxylic acid, benzophenonetetracarboxylic acid, biphenylethertetracarboxylic acid, ethyleneglycol bistrimellitate and propyleneglycol bistrimellitate and anhydrides thereof, aliphatic dicarboxylic acids such as oxalic acid, adipic acid, malonic acid, sebacic acid, azelaic acid, dodecanedicarboxylic acid, dicarboxypolybutadiene, dicarboxypoly(acrylonitrile-butadiene) and dicarboxypoly(styrene-butadiene), alicyclic dicarboxylic acids such as 1,4-cyclohexanedicarboxylic acid, 1,3-cyclohexanedicarboxylic acid, 4,4'-dicyclohexylmethanedicarboxylic acid and dimer acids, and aromatic dicarboxylic acids such as terephthalic acid, isophthalic acid, diphenylsulfonedicarboxylic acid, diphenyletherdicarboxylic acid and naphthalenedicarboxylic acid. Among them, 1,3-cyclohexanedicarboxylic acid, 1,4-cyclohexanedicarboxylic acid are preferable from the viewpoint of resistance to electrolytic solution, and dimer acids, dicarboxypolybutadiene having a molecular weight of 1000 or more, dicarboxypoly(acrylonitrilebutadiene) and dicarboxypoly (styrene-butadiene) are preferable from the viewpoint of shutdown characteristics.

Also, a part of a trimellitic acid compound can be replaced by a glycol to introduce a urethane group into the molecule. Examples of the glycol include alkylene glycols such as ethylene glycol, propylene glycol, tetramethylene glycol, neopentyl glycol and hexanediol, polyalkylene glycols such as polyethylene glycol, polypropylene glycol and polytetramethylene glycol, and polyesters having a hydroxyl group at the terminal, which are synthesized from one or two or more of the above-mentioned dicarboxylic acids and one or two or more of the above-mentioned glycols, and among them, polyethylene glycol and polyesters having a hydroxyl group at the terminal are preferable from the viewpoint of shutdown effects. The number average molecular weight of these glycols is preferably 500 or more, more preferably 1,000 or more. The upper limit thereof is not particularly limited; however, it is preferably less than 8000.

When a part of the acid component is replaced by at least one of the group consisting of a dimer acid, a polyalkylene ether, a polyester, and a butadiene-based rubber containing any one of a carboxyl group, a hydroxyl group and an amino group at the terminal, it is preferable to replace 1 to 60 mol% of the acid component.

Examples of a diamine (diisocyanate) component that is used for synthesis of the polyamideimide resin include aliphatic diamines such as o-tolidine, tolylenediamine, ethylenediamine, propylenediamine and hexamethylenediamine and diisocyanates thereof, alicyclic diamines such as 1,4-cyclohexanediamine, 1,3-cyclohexanediamine and dicyclohexylmethanediamine and diisocyanates thereof, and aromatic diamines such as m-phenylenediamine, p-phenylenediamine, 4,4'-diaminodiphenyl methane, 4,4'-diaminodiphenyl ether, 4,4'-diaminodiphenyl sulfone, benzidine, xylylenediamine and naphthalenediamine and diisocyanates thereof, and among them, dicyclohexylmethanediamine and a diisocyanate thereof are most preferable, and 4,4'-diaminodiphenyl methane, naphthalenediamine and diisocyanates thereof are preferable, from the viewpoints of reactivity, costs and resistance to electrolytic solution. In particular, o-tolidine diisocyanate (TODI), 2,4-tolidine diisocyanate (TDI) and blends thereof are preferable. Particularly, for improving the adhesiveness of the porous membrane B, the content of o-tolidine isocyanate (TODI), which has a high stiffness, is preferably 50 mol% or more, more preferably 60 mol% or more, further preferably 70 mol% or more based on the total amount of isocyanate.

The polyamideimide resin can be easily produced by stirring a raw material component with heating at 60 to 200° C. in a polar solvent such as N,N'-dimethylformamide, N,N'-dimethylacetamide, N-methyl-2-pyrrolidone or γ-butyrolactone. In this case, an amine such as triethylamine or diethylamine, or an alkali metal salt such as sodium fluoride, potassium fluoride, cesium fluoride or sodium methoxide can also be used as a catalyst as necessary.

When the polyamideimide resin is used, the logarithmic viscosity thereof is preferably 0.5 dl/g or more. If the logarithmic viscosity is less than 0.5 dl/g, sufficient melt-down characteristics may not be obtained due to a decrease in melt temperature, and the porous membrane becomes fragile because of its low molecular weight so that an anchor effect is deteriorated, leading to a reduction in adhesiveness. On the other hand, the upper limit of the logarithmic viscosity is preferably less than 2.0 dl/g in consideration of processability and solvent solubility.

The porous membrane B is obtained by applying, to a predetermined base film, a heat-resistant resin solution (varnish) prepared by dissolving a heat-resistant resin in a solvent, which can dissolve the heat-resistant resin and is miscible with water, phase-separating the heat-resistant resin and the solvent miscible with water under humidified conditions, and placing the coated base film into a water bath (solidification bath) to solidify the heat-resistant resin. A phase separation aid may be added to the varnish as necessary.

Examples of the solvent that can be used for dissolving the heat-resistant resin include N,N-dimethylacetamide (DMAc), N-methyl-2-pyrrolidone (NMP), hexamethyltriamide phosphate (HMPA), N,N-dimethylformamide (DMF), dimethylsulfoxide (DMSO), γ-butyrolactone, chloroform, tetrachloroethane, dichloroethane, 3-chloronaphthalene, parachlorophenol, tetralin, acetone and acetonitrile, and an appropriate solvent can be freely selected according to the solubility of the resin.

The solid concentration of the varnish is not particularly limited as long as uniform application can be performed; however, it is preferably 2% by weight or more and 50% by weight or less, further preferably 4% by weight or more and 40% by weight or less. If the solid concentration is less than 2% by weight, the obtained porous membrane B may become fragile. If the solid concentration is more than 50% by weight, it may become difficult to control the thickness of the porous membrane B.

The phase separation aid is selected from water, alkylene glycols such as ethylene glycol, propylene glycol, tetramethylene glycol, neopentyl glycol and hexanediol, polyalkylene glycols such as polyethylene glycol, polypropylene glycol and polytetramethylene glycol, water-soluble polyesters, water-soluble polyurethanes, polyvinyl alcohol, carboxymethyl cellulose and the like, and the amount thereof to be added is preferably 10 to 90% by weight, further preferably 20 to 80% by weight, most preferably 30 to 70% by weight based on the weight of the vanish solution.

By mixing the phase separation aid in the varnish, mainly the gas permeation resistance, the surface porosity and the speed of formation of a layer structure can be controlled. If the amount to be added is less than the above-mentioned range, a significant increase in phase separation speed may not be obtained, and if the amount to be added is more than the above-mentioned range, the coating solution may be clouded at the mixing stage, leading to precipitation of the resin component.

Also, inorganic particles or heat-resistant polymer particles may be added to the varnish for reducing the thermal shrinkage ratio of the porous layer B and imparting slippage. When particles are added, the upper limit of the amount thereof to be added is preferably 95% by mass. If the amount to be added is more than 95% by mass, the ratio of the heat-resistant resin to the total volume of the porous membrane B decreases so that a sufficient adhesiveness of the heat-resistant resin to the porous membrane A may not be obtained.

Examples of the inorganic particles include calcium carbonate, potassium phosphate, amorphous silica, crystalline glass filler, kaolin, talc, titanium dioxide, alumina, silica-alumina composite oxide particles, barium sulfate, calcium fluoride, lithium fluoride, zeolite, molybdenum sulfate and mica. Examples of the heat-resistant polymer particles include crosslinked polystyrene particles, crosslinked acrylic resin particles, crosslinked methyl methacrylate-based particles, benzoguanamine/formaldehyde condensate particles, melamine/formaldehyde condensate particles and polytetrafluoroethylene particles.

The film thickness of the porous membrane B is preferably 1 to 5 μm, further preferably 1 to 4 μm, most preferably 1 to 3 μm. If the film thickness is less than 1 μm, the membrane breakage strength and insulation when the porous membrane A is melted and shrunk at a temperature equal to or higher than the melting point may not be ensured, and if the film thickness is more than 5 μm, the ratio of the porous membrane A in the composite porous membrane is low so that a sufficient shutdown function cannot be obtained, and an abnormal reaction may not be suppressed. In addition, the winding volume may increase, thus being not suitable for an increase of the capacity of a battery which will be advanced in future.

The porosity of the porous membrane B is preferably 30 to 90%, further preferably 40 to 70%. If the porosity is less than 30%, the electric resistance of the membrane increases so that it becomes difficult to pass a large current. On the other hand, if the porosity is more than 90%, the membrane strength tends to decrease. The gas permeation resistance of the porous membrane B is preferably 1 to 2,000 seconds/100 ccAir as measured by a method in accordance with JIS-P8117. The gas permeation resistance is more preferably 50 to 1,500 seconds/100 ccAir, further preferably 100 to 1,000 seconds/100 ccAir. If the gas permeation resistance is less than 1 second/100 ccAir, the membrane strength may decrease, and if the gas permeation resistance is more than 2,000 seconds/100 ccAir, cycle characteristics may be deteriorated.

The upper limit of the total thickness of a composite porous membrane obtained by laminating the porous membrane A and the porous membrane B is 13 μm, further preferably 12 μm. The lower limit thereof is preferably 6 μm or more, further preferably 7 μm or more. If the thickness is more than 13 μm, a rise in gas permeation resistance may increase, and also it may become difficult to avoid a reduction in capacity because the area of electrodes that can be filled in a container decreases. If the thickness is less than 6 μm, it may become difficult to ensure sufficient mechanical strength and insulation.

In the composite porous membrane, the difference (Y-X) between the gas permeation resistance (X seconds/100 ccAir) of the porous membrane A and the gas permeation resistance (Y seconds/100 ccAir) of the entire composite porous membrane has a relationship of 20 seconds/100 ccAir Y-X 100 seconds/100 ccAir. If Y-X is less than 20 seconds/100 ccAir, a sufficient adhesiveness of the heat-resistant resin layer cannot be obtained. If Y-X is more than 100 seconds/100 ccAir, a significant rise in gas permeation resistance is caused, and as a result, an ion permeability is deteriorated at the time of incorporation into a battery so that the separator becomes unsuitable for a high-performance battery.

Further, the gas permeation resistance of the composite porous membrane is preferably 50 to 600 seconds/100 ccAir, further preferably 100 to 500 seconds/100 ccAir, most preferably 100 to 400 seconds/100 ccAir. If the value of gas permeation resistance is lower than 50 seconds/100 ccAir, clogging with foreign matters, a short circuit and breakage of a membrane may be caused because sufficient insulation cannot be obtained, and if the value of gas permeation resistance is higher than 600 seconds/100 ccAir, charge/discharge characteristics and life characteristics, which fall within the range of practical use, may not be obtained because of high membrane resistance.

Next, a method of producing the composite porous membrane will be described.

In the method of producing the composite porous membrane, a varnish (heat-resistant resin solution) is first applied onto a base film such as a polyester-based film or a polyolefin-based film, and then the coated film is allowed to pass through a low-humidity zone. In the mean time, a heat-resistant resin in the varnish and a solvent in which the resin is dissolved are phase-separated.

Examples of the method of applying the varnish include a reverse roll coating method, a gravure coating method, a kiss coating method, a roll brush method, a spray coating method, an air knife coating method, a wire bar bar-coating method, a pipe doctor method, a blade coating method and a die coating method, and these methods can be used alone or in combination.

The low-humidity zone is a zone adjusted such that the absolute humidity is less than 6 $g/m^3$. The upper limit of the absolute humidity is 4 $g/m^3$, further preferably 3 $g/m^3$, and the lower limit thereof is preferably 0.5 $g/m^3$, more preferably 0.8 $g/m^3$. If the absolute humidity is less than 0.5 $g/m^3$, a porous membrane is hard to be formed ultimately because phase separation is not sufficiently performed so that a rise in gas permeation resistance may be increased. If the absolute humidity is 6 $g/m^3$ or more, solidification of the heat-resistant resin starts in parallel to phase separation, and when the porous membrane A is bonded, penetration of the heat-resistant resin into the porous membrane A is not sufficiently performed so that a sufficient adhesiveness of the heat-resistant resin cannot be obtained. The time of passage through the low-humidity zone is preferably 3 seconds or more and 20 seconds or less. If the time is less than 3 seconds, the phase separation may not be sufficiently performed, while if the time is more than 20 seconds, solidification of the heat-resistant resin may excessively proceed.

Then, the coated film is allowed to pass through a high-humidity zone so that a semi-gel heat-resistant resin membrane is formed on the base film. The high-humidity zone is a zone adjusted such that the lower limit of the absolute humidity is 6 $g/m^3$, preferably 7 $g/m^3$, further preferably 8 $g/m^3$, and the upper limit thereof is 25 $g/m^3$, preferably 17 $g/m^3$, further preferably 15 $g/m^3$. If the absolute humidity is less than 6 $g/m^3$, gelation (immobilization) is not sufficiently achieved, and therefore when the porous membrane A is bonded, penetration of the heat-resistant resin into the porous membrane A excessively proceeds so that a rise in gas permeation resistance is increased. If the absolute humidity is more than 25 $g/m^3$, solidification of the heat-resistant resin excessively proceeds, and penetration of the heat-resistant resin into the porous membrane A is excessively reduced so that a sufficient adhesiveness may not be obtained. The time of passage through the high-humidity zone is preferably 3 seconds or more and 10 seconds or less. If the time is less than 3 seconds, gelation (immobilization) is not sufficiently achieved, and therefore when the porous membrane A is bonded, penetration of the heat-resistant resin into the porous membrane A excessively proceeds so that a rise in gas permeation resistance may be increased, while if the time is more than 10 seconds, solidification of the heat-resistant resin excessively proceeds, and penetration of the heat-resistant resin into the porous membrane A is excessively reduced so that a sufficient adhesiveness may not be obtained.

Temperature conditions for both the low-humidity zone and the high-humidity zone are not particularly limited as long as the absolute humidity falls within the above-mentioned range.

However, the temperature is preferably 20° C. or higher and 50° C. or lower from the viewpoint of energy conservation. The thickness of the film base material is not particularly limited as long as it is such a thickness that flatness can be maintained. However, a thickness of 25 μm to 100 μm is preferred. If the thickness is less than 25 μm, sufficient flatness may not be obtained. Even if the thickness is more than 100 μm, flatness is not improved.

Next, the porous membrane A is bonded onto the semi-gel heat-resistant resin membrane thus formed so that no air bubbles are included. As a bonding method, a method in which films coming from two directions are combined on the surface of one metal roll is preferable because damages to the film are small. The "semi-gel" means that gelled regions and regions retaining a solution state coexist in the process of gelation of a polyamideimide resin solution by absorption of moisture in the atmosphere.

The time period during which the porous membrane A is bonded onto the semi-gel heat-resistant resin membrane is preferably at least within 10 seconds just after passage through the high-humidity zone. If the time period is more than 10 seconds, solidification of the heat-resistant resin membrane proceeds so that a sufficient adhesiveness of the porous membrane B may not be obtained.

The base film may be peeled off after formation of the heat-resistant resin membrane. However, in the method, it is preferable to bond the porous membrane A to the heat-resistant resin membrane without peeling off the base film. When this method is used, a composite porous membrane can be produced even if a porous membrane A, which has a low elastic modulus and is so soft that it is necked by tension during processing, is used. Specifically, a feature of excellent process operability can be expected such that the composite porous membrane is neither wrinkled nor creased during passage through a guide roll, curls at the time of drying can be reduced and the like. At this time, the base material and the composite porous membrane may be wound at the same time, or the base material and the composite porous membrane may be wound around separate winding rolls after passing through a drying step. However, the latter winding method is more preferable because less possibility of winding deviation.

Next, the bonded porous membrane A and heat-resistant resin membrane are immersed in a solidification bath so that the heat-resistant resin membrane is subjected to phase transition and thereby converted into the porous membrane B. The composition of the solidification bath is not particularly limited. However, it can be, for example, an aqueous solution containing 1 to 20% by weight, further preferably 5 to 15% by weight of a good solvent for a heat resistant resin for forming the porous membrane B. By immersion in the solidification bath, the porous membrane B is transferred to the porous membrane A over the entire surface to obtain an unwashed composite porous membrane. This is because a part of the porous membrane B is moderately engaged in fine pores of the porous membrane A so that an anchor effect is exhibited.

A final porous membrane can be obtained by further subjecting the unwashed porous membrane to a washing step using pure water or the like, and a drying step using hot air at 100° C. or lower.

For washing, a general method such as warming, ultrasonic irradiation or bubbling can be used. Further, for keeping constant the concentration within each bath and improving washing efficiency, a method of removing a solution within the porous membrane between baths is effective. Specific examples thereof include a method of forcing out a solution within a porous layer by air or an inert gas and a method of physically squeezing out a solution within a membrane by a guide roll.

According to the method, a composite porous membrane excellent in balance between the adhesiveness and the gas permeation resistance is obtained even if the thickness of the porous membrane A is less than 10 µm.

The composite porous membrane can be prepared using, as the porous membrane A, a polyolefin-based porous membrane having slits in an intended width. However, it is also possible to continuously carry out processing online when the polyolefin porous membrane is prepared. "Online" refers to a means of continuously laminating the porous membrane B after a step of producing a polyolefin porous membrane (specifically a drying step after washing), and passing through each step of solidification, washing and slitting to obtain a desired composite porous membrane. By performing the online coating, mass production can be realized, thus being very advantageous in terms of costs.

It is desirable to store the composite porous membrane in a dry state. However, if storage in an absolute dry state is difficult, the composite porous membrane is preferably subjected to a vacuum drying treatment at 100° C. or lower just before use.

The composite porous membrane may be used as a separator for a nickel-hydrogen battery, a nickel-cadmium battery, a nickel-zinc battery, a silver-zinc battery, a secondary battery such as a lithium secondary battery or a lithium polymer secondary battery, and a plastic film capacitor, a ceramic capacitor, an electric double-layer capacitor and the like. However, it is particularly preferably used as a separator for a lithium secondary battery. A description will be provided below while taking a lithium secondary battery as an example.

In a lithium secondary battery, a positive electrode and a negative electrode are laminated with a separator interposed therebetween, and the separator contains an electrolytic solution (electrolyte). The structure of the electrode is not particularly limited, and can be a known structure. For example, an electrode structure (coin type) in which disc-shaped positive electrode and negative electrode are placed to face each other, an electrode structure (lamination type) in which planner positive electrode and negative electrode are alternately laminated, an electrode structure (winding type) in which band-shaped positive electrode and negative electrode are overlapped and wound and the like can be employed.

The positive electrode includes a current collector and a positive electrode active substance layer formed on the surface of the current collector and containing a positive electrode active substance capable of absorbing and desorbing lithium ions. Examples of the positive electrode active substance include inorganic compounds such as a transition metal oxide, a composite oxide of lithium and a transition metal (lithium composite oxide) and a transition metal sulfide, and examples of the transition metal include V, Mn, Fe, Co and Ni. Preferred examples of the lithium composite oxide among positive electrode active substances include lithium nickelate, lithium cobaltate, lithium manganate, and a layered lithium composite oxide having an $\alpha$-NaFeO$_2$ type structure as a matrix.

The negative electrode includes a current collector and negative electrode active substance layer formed on the surface of the current collector and containing an negative electrode active substance. Examples of the negative electrode active substance include carbonaceous materials such as natural graphite, artificial graphite, cokes and carbon black. An electrolytic solution is obtained by dissolving a lithium salt in an organic solvent. Examples of the lithium salt include LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, a lithium salt of a lower aliphatic carboxylic acid and LiAlCl$_4$. They may be used alone or in combination of two or more kinds thereof. Examples of the organic solvent include organic solvents having a high boiling point and a high dielectric constant such as ethylene carbonate, propylene carbonate, ethylmethyl carbonate and $\gamma$-butyrolactone, and organic solvents having a low boiling point and a low viscosity such as tetrahydrofuran, 2-methyltetrahydrofuran, dimethoxyethane, dioxolane, dimethyl carbonate and diethyl carbonate. They may be used alone or in combination of two or more kinds thereof. Particularly, since an organic solvent having a high dielectric constant has a high viscosity, and an organic solvent having a low viscosity has a low dielectric constant, these organic solvents are preferably mixed and used.

When assembling a battery, a separator (composite porous membrane) is impregnated with an electrolytic solution. Consequently, an ion permeability can be imparted to the separator. Usually, an impregnation treatment is carried out by immersing a composite porous membrane in an electrolytic solution at normal temperature. For example, when a cylindrical battery is assembled, first a positive electrode sheet, a separator (composite porous membrane), and a negative electrode sheet are laminated in this order, and the laminate is wound up from one end to form a winding type electrode device. Next, this electrode device is inserted into a battery can, and impregnated with the above-mentioned electrolyte solution, and then a battery cap having a safety valve and serving as a positive electrode terminal is caulked via a gasket, whereby a battery can be obtained.

EXAMPLES

Our membranes and methods will be specifically described by way of examples. However, this disclosure is not limited in any way to these examples. The measurement values in the examples were determined by the following methods.

(1) Film Thickness

The film thickness was measured by using a contact-type film thickness meter (Digital Micrometer M-30; manufactured by SONY Manufacturing Systems Corporation).

(2) Peel Strength at Interface Between Porous Membrane A and Porous Membrane B

An adhesive tape (manufactured by NICHIBAN CO., LTD.; No. 405; 24 mm width) was attached to the surface of the porous membrane B of a separator obtained in each of examples and comparative examples, and the separator was cut into a size having a width of 24 mm and a length of 150 mm to prepare a test sample.

The peel strength at the interface between the porous membrane A and the porous membrane B was measured by a peel method (peel speed: 500 mm/minute; T-type peel) using a tensile tester ["Tensilon RTM-100" manufactured by A&D Company, Limited] under conditions of 23° C. and 50% RH. The measurement was sequentially conducted over a span of 100 mm from the start of the measurement to the end of the measurement, an average value of the measurement values was calculated, and converted into a value per 25 mm width and the value was determined as peel strength. The surface of the porous membrane B remained on the porous membrane A side at the peel interface, and in this case, the above-described value was also calculated as peel strength at the interface between the porous membrane A and the porous membrane B.

(3) Average Pore Diameter

The average pore diameter of the porous membrane A was measured by the following method. A test piece was fixed on a measuring cell using a double-sided tape, platinum or gold was vacuum-deposited for several minutes, and the measurement was conducted under appropriate magnification. Arbitrary 10 points in an area observed at the nearest side on an image obtained in SEM measurement were selected, an average value of pore diameters in 10 points was determined as an average pore diameter of the test piece. In the case where the pore was not substantially circular, a value obtained by summing a longer diameter and a shorter diameter and dividing the sum by 2 was determined as a pore diameter.

(4) Gas Permeation Resistance

Using Gurley Type Densometer Model B manufactured by TESTER SANGYO CO., LTD, the composite porous membrane, which was fixed between a clumping plate and an adaptor plate so that no wrinkles occurred, was measured in accordance with JIS P-8117. Two 10 cm-square pieces were provided as samples, the measurement was conducted for total 10 points with the center and four corners of the sample being determined as measurement points for each sample, and an average value in 10 points was used as a gas permeation resistance [seconds/100 ccAir]. In the case where the length of one side of the sample was less than 10 cm, a value obtained by conducting the measurement for 10 points at intervals of 5 cm may be used.

(5) Logarithmic Viscosity

A solution obtained by dissolving 0.5 g of a heat-resistant resin in 100 ml of NMP was measured at 25° C. using an Ubbelohde viscometer.

(6) Glass Transition Temperature

A heat-resistant resin solution or a resin solution obtained by dissolving only a heat-resistant resin membrane by immersing a composite porous membrane in a good solvent was applied onto a PET film (E5001 manufactured by TOYOBO CO., LTD.) or a polypropylene film (Pyrene-OT manufactured by TOYOBO CO., LTD.) with an appropriate gap using an applicator, peeled off after predrying at 120° C. for 10 minutes, and further dried in vacuum at 200° C. for 12 hours while it was fixed with a heat-resistant adhesive tape in a metal frame having an appropriate size so that a dry film was obtained. A test piece having a width of 4 mm and a length of 21 mm was cut out from the obtained dry film, and the measurement was conducted while raising the temperature from room temperature to 450° C. under conditions of 110 Hz and a temperature rising rate of 4° C./minute by using a dynamic viscoelasticity measuring apparatus (DVA-220; manufactured by IT Keisoku Seigyo Co. Ltd.) with a measurement length of 15 mm so that a storage elastic modulus (E') was measured. At a refraction point of the storage elastic modulus (E') thus measured, a temperature at a crossing point between an extended line of a base line equal to or below a glass transition temperature, and a tangent line showing the maximum inclination above the refraction point was determined as a glass transition temperature.

(7) Porosity

A 10 cm-square sample was provided, the sample volume ($cm^3$) and the mass (g) thereof were measured, and a porosity (%) was calculated from the obtained results using the following formula. The sample volume ($cm^3$) of the 10 cm-square sample can be determined from 10 (cm)×10 (cm)×thickness (cm) of porous membrane A.

$$\text{porosity}=(1-\text{mass}/(\text{resin density}\times\text{sample volume}))\times 100$$

Example 1

In a four-necked flask equipped with a thermometer, a condenser and a nitrogen gas introducing tube, 1 mol of a trimellitic anhydride (TMA), 0.8 mol of o-tolidine diisocyanate (TODI), 0.2 mol of 2,4-tolylene diisocyanate (TDI) and 0.01 mol of potassium fluoride were charged together with N-methyl-2-pyrrolidone so that the solid concentration was 20%, and the mixture was stirred at 100° C. for 5 hours, and then diluted with N-methyl-2-pyrrolidone so that the solid concentration was 14%, to synthesize a polyamideimide solution (a). The obtained polyamideimide resin had a logarithmic viscosity of 1.35 dl/g and a glass transition temperature of 320° C.

Forty-eight parts by mass of the polyamideimide solution (a) was diluted with 39 parts by mass of N-methyl-2-pyrrolidone, and 13 parts by mass of ethylene glycol was added thereto to prepare a varnish (a) (solid content: 5.5% by weight). The varnish (a) was applied to a corona-treated surface of a polyethylene terephthalate resin film (E5101; manufactured by TOYOBO CO., LTD.) having a thickness of 50 μm by a blade coating method, the coated film was allowed to pass through a low-humidity zone at a temperature of 25° C. and an absolute humidity of 1.8 $g/m^3$ for 8 seconds, and subsequently pass through a high-humidity zone at a temperature of 25° C. and an absolute humidity of 12 $g/m^3$ for 5 seconds to form a semi-gel heat-resistant resin membrane, and after 1.7 seconds, a porous membrane A (made of polyethylene; thickness: 9 μm; porosity: 45%; average pore diameter: 0.15 gm and gas permeation resistance: 240 seconds/100 ccAir) was laminated on the semi-gel heat-resistant resin membrane, and the laminate was immersed in an aqueous solution containing 5% by weight of N-methyl-2-pyrrolidone, then washed with pure water, and then allowed to pass through a hot-air drying furnace at a temperature of 70° C. to thereby be dried so that a composite porous membrane having a final thickness of 11.8 gm was obtained.

Example 2

A composite porous membrane was obtained in the same manner as in Example 1 except that the absolute humidity of the low-humidity zone was 4.0 $g/m^3$.

Example 3

A composite porous membrane was obtained in the same manner as in Example 1 except that the absolute humidity of the low-humidity zone was 5.5 $g/m^3$.

Example 4

A composite porous membrane was obtained in the same manner as in Example 1 except that the absolute humidity of the high-humidity zone was 7.0 g/m³.

Example 5

A composite porous membrane was obtained in the same manner as in Example 1 except that the absolute humidity of the high-humidity zone was 16.0 g/m³.

Example 6

A composite porous membrane was obtained in the same manner as in Example 1 except that the time of passage through the low-humidity zone and the high-humidity zone were 5.3 seconds and 3.0 seconds, respectively, and the time elapsing after passage through the high-humidity zone until bonding of the porous membrane made of polyethylene was 1.1 seconds.

Example 7

A composite porous membrane was obtained in the same manner as in Example 1 except that the time of passage through the low-humidity zone and the high-humidity zone were 16.0 seconds and 10.0 seconds, respectively, and the time elapsing after passage through the high-humidity zone until bonding of the porous membrane made of polyethylene was 3.4 seconds.

Example 8

A composite porous membrane was obtained in the same manner as in Example 1 except that a porous membrane made of polyethylene having a thickness of 9.5 μm, a porosity of 40%, an average pore diameter of 0.15 μm and a gas permeation resistance of 320 seconds/100 ccAir was used as the porous membrane A.

Example 9

A composite porous membrane was obtained in the same manner as in Example 1 except that a porous membrane made of polyethylene having a thickness of 7.0 μm, a porosity of 40%, an average pore diameter of 0.15 μm and a gas permeation resistance of 220 seconds/100 ccAir was used as the porous membrane A.

Example 10

In a four-necked flask equipped with a thermometer, a condenser and a nitrogen gas introducing tube, 1 mol of a trimellitic anhydride (TMA), 0.80 mol of o-tolidine diisocyanate (TODI), 0.20 mol of diphenylmethane-4,4'-diisocyanate (MDI) and 0.01 mol of potassium fluoride were charged together with N-methyl-2-pyrrolidone so that the solid concentration was 20%, and the mixture was stirred at 100° C. for 5 hours, and then diluted with N-methyl-2-pyrrolidone so that the solid concentration was 14%, to synthesize a polyamideimide solution (b). The obtained polyamideimide resin had a logarithmic viscosity of 1.05 dl/g and a glass transition temperature of 313° C. A composite porous membrane was obtained in the same manner as in Example 1 except that a varnish (b) (solid concentration: 5.5% by weight) prepared by using the polyamideimide resin solution (b) in place of the polyamideimide resin solution (a) was used.

Example 11

In a four-necked flask equipped with a thermometer, a condenser and a nitrogen gas introducing tube, 1 mol of a trimellitic anhydride (TMA), 0.60 mol of o-tolidine diisocyanate (TODI), 0.40 mol of diphenylmethane-4,4'-diisocyanate (MDI) and 0.01 mol of potassium fluoride were charged together with N-methyl-2-pyrrolidone so that the solid concentration was 20%, and the mixture was stirred at 100° C. for 5 hours, and then diluted with N-methyl-2-pyrrolidone so that the solid concentration was 14%, to synthesize a polyamideimide solution (c). The obtained polyamideimide resin had a logarithmic viscosity of 0.85 dl/g and a glass transition temperature of 308° C. A composite porous membrane was obtained in the same manner as in Example 1 except that a varnish (c) (solid concentration: 5.5% by weight) prepared by using the polyamideimide resin solution (c) in place of the polyamideimide resin solution (a) was used.

Example 12

First, 32.6 parts by mass of the polyamideimide solution (a) and 10.5 parts by mass of alumina particles having an average particle diameter of 0.5 gm were diluted with 48.4 parts by mass of N-methyl-2-pyrrolidone, 8.5 parts by mass of ethylene glycol were then added, and the mixture was charged in a container made of polypropylene together with zirconium oxide beads (trade name "Toracelambeads" manufactured by TORAY INDUSTRIES, LTD.; particle diameter: 0.5 mm), and dispersed for 6 hours by Paint Shaker (manufactured by TOYO SEIKI Co., Ltd.). Then, the resulting dispersion was filtered with a filter with a filtration limit of 5 μm to prepare a varnish (d) (solid concentration: 30.0% by weight). A composite porous membrane was obtained in the same manner as in Example 1 except that the varnish (a) was replaced by the varnish (d).

Example 13

A composite porous membrane was obtained in the same manner as in Example 12 except that a varnish (e) (solid concentration: 30.0% by weight) prepared by using titanium oxide particles (trade name "KR-380" manufactured by Titan Kogyo, Ltd.; average particle diameter: 0.38 μm) in place of alumina particles was used.

Example 14

A composite porous membrane was obtained in the same manner as in Example 1 except that the application amount of the porous membrane B was adjusted so that the final thickness was 10.5 μm.

Example 15

A composite porous membrane was obtained in the same manner as in Example 1 except that a porous membrane made of polyethylene having a thickness of 6.5 μm, a porosity of 38%, an average pore diameter of 0.15 μm and a gas permeation resistance of 210 seconds/100 ccAir was used as the porous membrane A.

Example 16

A composite porous membrane was obtained in the same manner as in Example 1 except that the absolute humidity of the low-humidity zone was 1.2 g/m³.

Comparative Example 1

A composite porous membrane was obtained in the same manner as in Example 1 except that the temperature of the low-humidity zone was 25° C. and the absolute humidity thereof was 7.0 g/m³.

Comparative Example 2

A composite porous membrane was obtained in the same manner as in Example 1 except that the temperature of the high-humidity zone was 25° C. and the absolute humidity thereof was 5.0 g/m³.

Comparative Example 3

In a four-necked flask equipped with a thermometer, a condenser and a nitrogen gas introducing tube, 1 mol of a trimellitic anhydride (TMA), 0.76 mol of o-tolidine diisocyanate (TODI), 0.19 mol of 2,4-tolylene diisocyanate (TDI) and 0.01 mol of potassium fluoride were charged together with N-methyl-2-pyrrolidone so that the solid concentration was 20%, and the mixture was stirred at 100° C. for 5 hours, and then diluted with N-methyl-2-pyrrolidone so that the solid concentration was 14%, to synthesize a polyamideimide solution (f). The obtained polyamideimide resin had a logarithmic viscosity of 0.45 dl/g and a glass transition temperature of 315° C. A composite porous membrane was obtained in the same manner as in Example 1 except that a varnish (f) prepared by using the polyamideimide resin solution (f) in place of the polyamideimide resin solution (a) was used.

Comparative Example 4

The varnish (a) was applied to a porous membrane A (made of polyethylene; thickness: 9 μm; porosity: 45%; average pore diameter: 0.15 μm and gas permeation resistance: 240 seconds/100 ccAir) by a blade coating method, the coated film was allowed to pass through a low-humidity zone at a temperature of 25° C. and an absolute humidity of 1.8 g/m³ for 8 seconds, and subsequently pass through a high-humidity zone at a temperature of 25° C. and an absolute humidity of 12 g/m³ for 5 seconds, then immersed in an aqueous solution containing 5% by weight of N-methyl-2-pyrrolidone after 2 seconds, then washed with pure water, and then allowed to pass through a hot-air drying furnace at a temperature of 70° C. to thereby be dried so that a composite porous membrane having a final thickness of 11.8 μm was obtained.

Comparative Example 5

A composite porous membrane was obtained in the same manner as in Comparative Example 4 except that the porous membrane A (made of polyethylene; thickness: 9 μm; porosity: 45%; average pore diameter: 0.15 μm and gas permeation resistance: 240 seconds/100 ccAir) was preliminarily immersed in N-methyl-2-pyrrolidone to fill fine pores with N-methyl-2-pyrrolidone.

Comparative Example 6

A composite porous membrane was obtained in the same manner as in Example 1 except that the varnish (a) was applied to a corona-treated surface of a polyethylene terephthalate resin film (E5101; manufactured by TOYOBO CO., LTD.; thickness: 50 μm) by a blade coating method, the coated film was subsequently allowed to pass through a high-humidity zone at a temperature of 25° C. and an absolute humidity of 18.4 g/m³ for 30 seconds, and after 1.7 seconds, a porous membrane made of polyethylene having a thickness of 10 μm, a porosity of 47%, an average pore diameter of 0.20 μm and a gas permeation resistance of 80 seconds/100 ccAir was laminated as the porous membrane A.

Comparative Example 7

A composite porous membrane was obtained in the same manner as in Example 1 except that the absolute humidity of the high-humidity zone was 25.5 g/m³.

Comparative Example 8

A composite porous membrane was obtained in the same manner as in Example 1 except that the application amount of the porous membrane B was adjusted so that the final thickness was 14.0 μm.

Conditions for production of the composite porous membranes of Examples 1 to 16 and Comparative Examples 1 to 8, and characteristics of the porous membrane A and the composite porous membrane are shown in Table 1.

TABLE 1

| | Porous membrane A | | | | | Low-humidity zone | | High-humidity zone | | Composite porous membrane | | Rise in gas permeation resistance (seconds/100 ccAir) | Peel strength (N/25 mm) |
|---|---|---|---|---|---|---|---|---|---|---|---|---|---|
| | Thickness (μm) | Gas permeation resistance (seconds/100 ccAir) | Average pore diameter (μm) | Porosity (%) | Varnish | Absolute humidity (g/m³) | Passage time (seconds) | Absolute humidity (g/m³) | Passage time (seconds) | Thickness (μm) | Gas permeation resistance (seconds/100 ccAir) | | |
| Example 1 | 9.0 | 240 | 0.15 | 45 | a | 1.8 | 8.0 | 12 | 5.0 | 11.8 | 300 | 60 | 2.1 |
| Example 2 | 9.0 | 240 | 0.15 | 45 | a | 4.0 | 8.0 | 12 | 5.0 | 11.8 | 277 | 37 | 1.5 |
| Example 3 | 9.0 | 240 | 0.15 | 45 | a | 5.5 | 8.0 | 12 | 5.0 | 11.8 | 270 | 30 | 1.3 |

TABLE 1-continued

| | Porous membrane A | | | | | Low-humidity zone | | High-humidity zone | | Composite porous membrane | | | |
|---|---|---|---|---|---|---|---|---|---|---|---|---|---|
| | Thickness (μm) | Gas permeation resistance (seconds/100 ccAir) | Average pore diameter (μm) | Porosity (%) | Varnish | Absolute humidity (g/m³) | Passage time (seconds) | Absolute humidity (g/m³) | Passage time (seconds) | Thickness (μm) | Gas permeation resistance (seconds/100 ccAir) | Rise in gas permeation resistance (seconds/100 ccAir) | Peel strength (N/25 mm) |
| Example 4 | 9.0 | 240 | 0.15 | 45 | a | 1.8 | 8.0 | 7 | 5.0 | 11.8 | 320 | 80 | 3.0 |
| Example 5 | 9.0 | 240 | 0.15 | 45 | a | 1.8 | 8.0 | 16 | 5.0 | 11.8 | 261 | 21 | 1.1 |
| Example 6 | 9.0 | 240 | 0.15 | 45 | a | 1.8 | 5.3 | 12 | 3.0 | 11.8 | 340 | 100 | 5.5 |
| Example 7 | 9.0 | 240 | 0.15 | 45 | a | 1.8 | 16.0 | 12 | 10.0 | 11.8 | 260 | 20 | 1.0 |
| Example 8 | 9.5 | 320 | 0.15 | 40 | a | 1.8 | 8.0 | 12 | 5.0 | 11.8 | 364 | 44 | 2.2 |
| Example 9 | 7.0 | 220 | 0.15 | 40 | a | 1.8 | 8.0 | 12 | 5.0 | 11.8 | 288 | 68 | 1.7 |
| Example 10 | 9.0 | 240 | 0.15 | 45 | b | 1.8 | 8.0 | 12 | 5.0 | 11.8 | 325 | 85 | 3.0 |
| Example 11 | 9.0 | 240 | 0.15 | 45 | c | 1.8 | 8.0 | 12 | 5.0 | 11.8 | 340 | 100 | 5.2 |
| Example 12 | 9.0 | 240 | 0.15 | 45 | d | 1.8 | 8.0 | 12 | 5.0 | 11.8 | 260 | 20 | 1.1 |
| Example 13 | 9.0 | 240 | 0.15 | 45 | e | 1.8 | 8.0 | 12 | 5.0 | 11.8 | 265 | 25 | 1.1 |
| Example 14 | 9.0 | 240 | 0.15 | 45 | a | 1.8 | 8.0 | 12 | 5.0 | 10.5 | 280 | 40 | 1.7 |
| Example 15 | 6.5 | 210 | 0.15 | 38 | a | 1.8 | 8.0 | 12 | 5.0 | 8.5 | 280 | 55 | 1.9 |
| Example 16 | 9.0 | 240 | 0.15 | 45 | a | 1.2 | 8.0 | 12 | 5.0 | 11.8 | 335 | 95 | 5.4 |
| Comparative Example 1 | 9.0 | 240 | 0.15 | 45 | a | 7.0 | 8.0 | 12 | 5.0 | 11.8 | 255 | 15 | 0.8 |
| Comparative Example 2 | 9.0 | 240 | 0.15 | 45 | a | 1.8 | 8.0 | 5 | 5.0 | 11.8 | 350 | 110 | 3.8 |
| Comparative Example 3 | 9.0 | 240 | 0.15 | 45 | f | 1.8 | 8.0 | 12 | 5.0 | 11.8 | 480 | 240 | 0.7 |
| Comparative Example 4 | 9.0 | 240 | 0.15 | 45 | a | 1.8 | 8.0 | 12 | 5.0 | 11.8 | 450 | 210 | 5.0 |
| Comparative Example 5 | 9.0 | 240 | 0.15 | 45 | a | 1.8 | 8.0 | 12 | 5.0 | 11.8 | 250 | 10 | 0.3 |
| Comparative Example 6 | 10.0 | 80 | 0.20 | 47 | a | — | — | 18.4 | 30.0 | 11.8 | 93 | 13 | 0.8 |
| Comparative Example 7 | 9.0 | 240 | 0.15 | 45 | a | 1.8 | 8.0 | 25.5 | 5.0 | 11.8 | 252 | 12 | 0.4 |
| Comparative Example 8 | 9.0 | 240 | 0.15 | 45 | a | 1.8 | 8.0 | 12 | 5.0 | 14.0 | 353 | 113 | 3.4 |

INDUSTRIAL APPLICABILITY

Our composite porous membrane achieves both an excellent adhesiveness of a heat-resistant resin layer and a small rise in gas permeation resistance even in the case of reducing the thickness of the membrane, and is therefore suitable for an increasing of the capacity of a battery, and for achievement of a high ion permeability and high-speed processability in a battery assembly processing step, and especially suitable as a battery separator.

The invention claimed is:

1. A method of producing a composite porous membrane, the composite porous membrane comprising:
   a porous membrane A formed of a polyolefin-based resin; and
   a porous membrane B containing a heat-resistant resin laminated to the porous membrane A,
   wherein the porous membrane A satisfies formulas (A) to (C), the composite porous membrane satisfies formula (D), and the composite porous membrane satisfies formulas (E) and (F):

thickness of porous membrane A<10 μm　　　formula (A);

0.01 μm ≤average pore diameter of porous membrane A≤1.0 μm　　　formula (B);

30% ≤porosity of porous membrane A≤70%　　　formula (C);

thickness of entire composite porous membrane≤13 μm　　　formula (D);

peel strength at interface between porous membrane A and porous membrane B≥1.0 N/25 mm　　　formula (E);

20≤Y−X≤100　　　formula (F), and wherein X is a gas permeation resistance (seconds/100 ccAir) of porous membrane A, and Y is a gas permeation resistance (seconds/100 ccAir) of the composite porous membrane,
   the method comprising the steps of:
   (i) applying a heat-resistant resin solution onto a base film, followed by passing the coated film through a low-humidity zone having an absolute humidity of less than 6 g/m³, and then through a high-humidity zone having an absolute humidity of 6 g/m³ or more and 25 g/m³ or less to form a heat-resistant resin membrane on the base film; and
   (ii) bonding together the heat-resistant resin membrane formed in step (i) and the porous membrane A formed of a polyolefin-based resin, followed by converting the heat-resistant resin membrane into the porous membrane B by immersion in a solidification bath, and washing and drying the same to obtain the composite porous membrane.

2. The method according to claim 1, wherein the base film is peeled off after the composite porous membrane is obtained in step (ii).

3. The method according to claim 1, wherein the base film is a polyester-based film or polyolefin-based film having a thickness of 25 to 100 μm.

4. The method according to claim 1, wherein in step (i), the time of passage through the low-humidity zone is 3 seconds or more and 20 seconds or less, and the time of passage through the high-humidity zone is 3 seconds or more and 10 seconds or less.

5. The method according to claim 2, wherein the base film is a polyester-based film or polyolefin-based film having a thickness of 25 to 100 μm.

* * * * *